(12) United States Patent
Ghosh et al.

(10) Patent No.: US 8,315,980 B2
(45) Date of Patent: Nov. 20, 2012

(54) PARALLEL EXECUTION OF WINDOW FUNCTIONS

(75) Inventors: Bhaskar Ghosh, Burlingame, CA (US); Nathan K. Folkert, San Francisco, CA (US); Thierry Cruanes, Foster City, CA (US); Sankar Subramanian, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1501 days.

(21) Appl. No.: 11/175,804

(22) Filed: Jul. 5, 2005

(65) Prior Publication Data
US 2006/0190947 A1    Aug. 24, 2006

Related U.S. Application Data

(60) Provisional application No. 60/655,679, filed on Feb. 22, 2005.

(51) Int. Cl.
*G06F 7/00* (2006.01)

(52) U.S. Cl. .................................................. 707/623

(58) Field of Classification Search ................ 719/313; 707/623
See application file for complete search history.

(56) References Cited

U.S. PATENT DOCUMENTS

| | | | |
|---|---|---|---|
| 5,956,704 A * | 9/1999 | Gautam et al. | 707/1 |
| 6,430,550 B1 * | 8/2002 | Leo et al. | 707/2 |
| 6,609,131 B1 * | 8/2003 | Zait et al. | 707/102 |
| 6,622,138 B1 * | 9/2003 | Bellamkonda et al. | 707/2 |
| 2004/0098359 A1 * | 5/2004 | Bayliss et al. | 707/1 |
| 2005/0188087 A1 * | 8/2005 | Iyoda | 709/226 |

* cited by examiner

*Primary Examiner* — Truong Vo
(74) *Attorney, Agent, or Firm* — Hickman Palermo Troung Becker Bingham Wong LLP

(57) ABSTRACT

Techniques are described for parallelizing qualifying window functions without reliance on partitioning criteria specified in the command that includes the qualifying window functions. Because the techniques do not rely on partitioning criteria specified in the command, the techniques may be used on commands in which no partitioning criteria is specified. In general, the techniques involve partitioning the work of a qualified window function into ranges, and sharing precomputed aggregate values between computational elements to calculate the value for the window functions.

26 Claims, 2 Drawing Sheets

PARALLEL EXECUTION OF WINDOW FUNCTIONS

RELATED APPLICATIONS

The present application claims priority to U.S. Provisional Patent Application No. 60/655,679, filed Feb. 22, 2005, entitled "Parallel Computation and Optimizations for Unipartitioned Analytic Functions", the contents of which are incorporated herein by this reference.

FIELD OF THE INVENTION

The present invention relates to window functions and, more specifically, to parallelization of window functions.

BACKGROUND

Many operations performed by a database server generate a series of result values (a "result item set") based on a series of input values (an "input item set"). For example, a database may store an "employee" table that includes a "salary" column. To implement an across-the-board salary increase, the database server may execute a database command that causes the database server to multiply all values in the salary column of the employee table by 1.1. In this example, the input item set is the original set of salary values, and the result item set is the set of new salary values produced by multiplying the old salary values by 1.05.

In the example given above, each value in the result item set was produced based on a corresponding value in the input item set. Specifically, the new salary value for a given input row of the salary table is generated based on the current salary value contained in the same row.

In contrast, with certain types of operations, more information than the corresponding input value must be known in order to generate a result value for the input value. For example, in order to generate the rank value for a particular input value, it is necessary to know how many input values precede the input value in the ranking.

Rank is an example of a "window function". Window functions are so named because they operate over a set of values from the input item set. In the context of a database system, the input item set typically corresponds to values from a particular column of rows that belong to a particular database table. The set of rows upon which the window functions operate are described by a window definition or window size. The window size describes which rows qualify for the window. The window has a starting row and an ending row. For example, a window defined for a moving average would have both the starting and end points of the window slide so that the end points maintain a constant physical or logical range. For example, the following query calculates a 3 month moving average per stock ticker.

AVG (stock_price) OVER (Partition By (stock_name) Order By (time) RANGE '3' MONTH PRECEDING)

The clause "Partition By (stock_name)" partitions the data by stock_name, and the clause "Order By (time)" orders the data time-wise within a partition. RANGE '3' MONTH PRECEDING is a logical expression of window size. In the example, the "window" has the logical size of three months. Alternatively, window size may be expressed by a physical interval. That is, the interval may refer to how the data is stored within the database. For example, the following query calculates the moving average for each stock ticker over 90 preceding rows of data.

AVG (stock_price) OVER (Partition By (stock_name) Order By (time) ROWS 90 PRECEDING)

TABLE 1 below illustrates a result set for the query containing the window function "AVG (stock_price) OVER (Partition By (stock_name) Order By (time) RANGE '3' MONTH PRECEDING)". The above window function calculates a moving average of stock price for each stock within a three month window.

TABLE 1

| Stock_name | Time | stock_price | moving_average |
|---|---|---|---|
| ORCL | 1-Jan'99 | 20 | 20 |
| ORCL | 1-Feb'99 | 30 | (20 + 30)/2 = 25 |
| ORCL | 1-Mar'99 | 58 | (20 + 30 + 58)/3 = 36 |
| ORCL | 1-Apr'99 | 11 | (30 + 58 + 11)/3 = 33 |
| ORCL | 1-May'99 | 51 | (58 + 11 + 51)/3 = 40 |
| ABCD | 1-Jan'99 | 25 | 25 |
| ABCD | 1-Feb'99 | 35 | (25 + 35)/2 = 30 |
| ABCD | 1-Mar'99 | 45 | (25 + 35 + 45)/3 = 35 |
| ABCD | 1-Apr'99 | 55 | (35 + 45 + 55)/3 = 45 |
| ABCD | 1-May'99 | 65 | (45 + 55 + 65)/3 = 55 |

Thus, the use of window functions enhances developer productivity because window functions allow for computerized decision support that may be either interactive or batch report jobs.

An important category of window functions is the "ranking" family of window functions. Window functions in the ranking family compute the rank of a row of data with respect to other rows of data in the dataset based on the values of a set of measures. To illustrate, the following query ranks salesmen in Acme Company based on sales amount in each geographical sales region.

SELECT sales_person, sales_region, sales_amount,
   RANK( ) OVER (PARTITION BY sales_region
     ORDER BY s_amount DESC) FROM Sales_table;

TABLE 2A below illustrates a result set for the preceding query. The "rank" column in Table 2A lists the sales persons in descending order based on the sales amount. The rank values are reset for each sales region.

TABLE 2A

| sales_person | sales_region | sales_amount | Rank |
|---|---|---|---|
| Adams | East | 100 | 1 |
| Baker | East | 99 | 2 |
| Connors | East | 89 | 3 |
| Davis | East | 75 | 4 |
| Edwards | West | 74 | 1 |
| Fitzhugh | West | 66 | 2 |
| Garibaldi | West | 45 | 3 |

Examples of window functions in the ranking family include RANK, DENSE_RANK, NTILE, PERCENT_RANK, ROW_NUMBER, and CUME_DIST. Window functions that belong to the ranking family are hereafter referred to as ranking functions. Ranking functions are widely used in queries for ranking rows of data in a dataset based on some ordering criterion and subsequently filtering out all but the rows in the top-N ranks. For example, assume that the query corresponding to TABLE 2A asked for the top 2 salespersons in each sales region based on the sales amount credited to each sales person. TABLE 2B illustrates a results set where data rows corresponding to a rank that is greater than 2 are filtered out. Queries that result in the computation and selection of top-N ranks are hereafter referred to as "TOP-N" queries.

TABLE 2B

| sales_person | sales_region | sales_amount | Rank |
|---|---|---|---|
| Adams | East | 100 | 1 |
| Baker | East | 99 | 2 |
| Edwards | West | 74 | 1 |
| Fitzhugh | West | 66 | 2 |

One way to process database commands more quickly involves parallelizing the execution of the commands. Parallelizing the execution of a command generally involves breaking the work required by the command into multiple sub-tasks, and causing the sub-tasks to be executed in parallel by a set of slave processes.

Window functions are typically parallelized based on the specifications of the PARTITION BY clause they contain. Specifically, the work that needs to be performed to execute a window function is divided up on a partition-by-partition basis. The partition-based sub-tasks are then assigned to slave processes for parallel execution.

Window functions are parallelized in this manner because the PARTITION BY clause insures that a slave working on data items from one partition will not require information about the input items that belong to other partitions. Parallelizing window functions using the partitions created by the PARTITION BY clause works well when the number of partitions created by the PARTITION BY clause of a database command is equal to or greater than the desired degree of parallelism.

Unfortunately, this is often not the case. For example, the PARTITION BY clause of a database command may establish only two partitions, even though the system executing the database command is able to support a much higher degree of parallelism. As another example, some database commands with window functions may not be partitioned at all. When parallelization is performed by dividing work on a partition-by-partition basis, unpartitioned window functions would not generally be parallelized, though intermediate ordering and rank predicate filtering could, at times, be parallelized.

Based on the foregoing, it is clearly desirable to provide a mechanism for parallelizing window functions that does not rely on the PARTITION BY clause of the command that includes the window function. By eliminating reliance on the PARTITION BY clause, the mechanism may effectively parallelize window functions that are unpartitioned.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
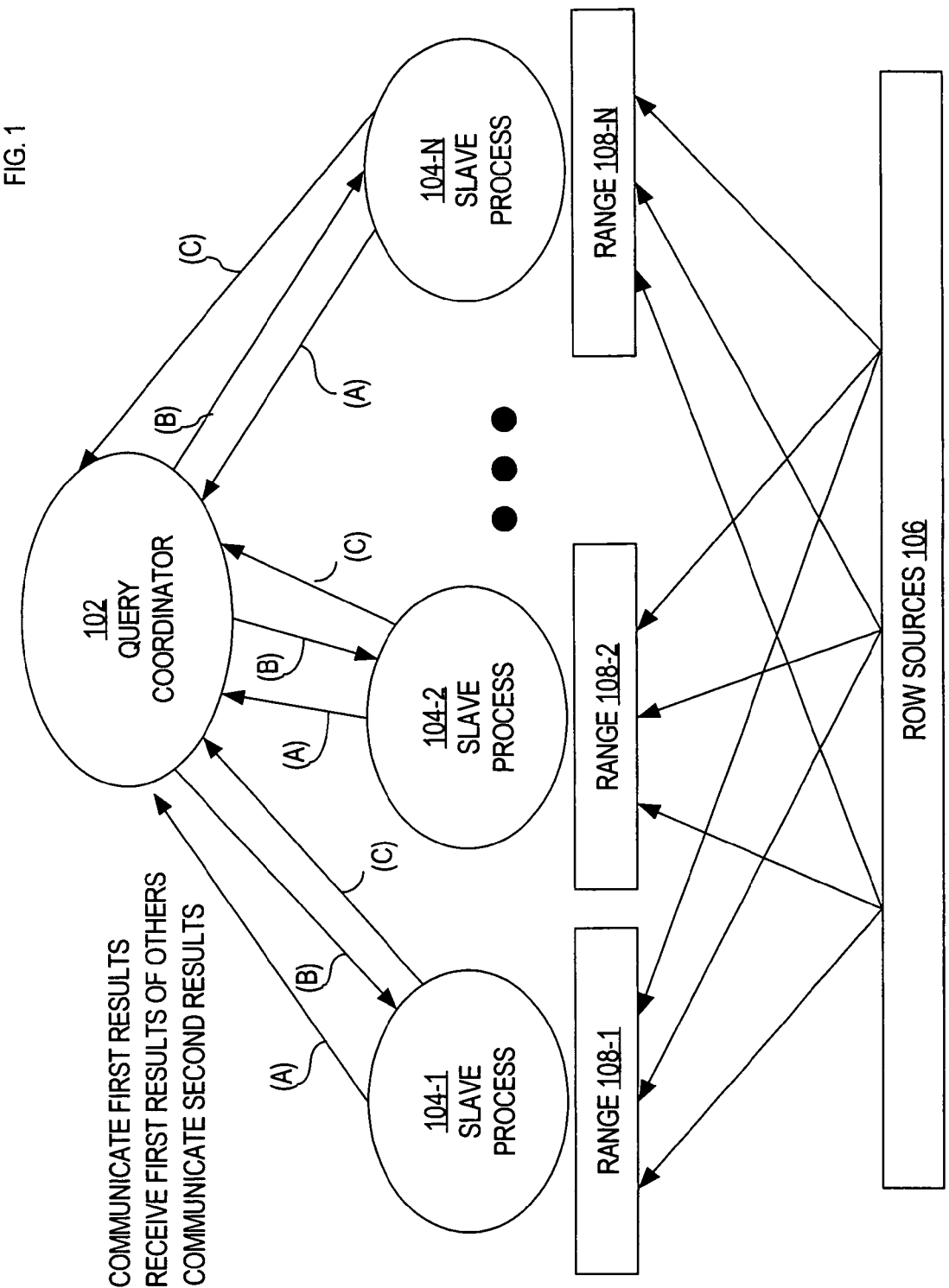
FIG. 1 is a block diagram illustrating interactions between a query coordinator and a set of slave processes, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Qualifying Window Functions

The techniques described herein may be used to parallelize window functions in which the output value for any given input value, in an ordered set of input values, can be computed using only
   the given input value,
   the other input values equal to that input value in the ordered set,
   the value of an unordered aggregate of the input values strictly less than the given input value in the ordered set, and
   the value of an unordered aggregate of all the input values in the ordered set.

Window functions that have these characteristics are referred to herein as "qualifying window functions".

EXAMPLES OF QUALIFYING WINDOW FUNCTIONS

Many window functions satisfy the criteria, specified above, for qualifying window functions. For example, many cumulative row and range-based functions (ORDER BY . . . ROWS BETWEEN UNBOUNDED PRECEDING AND CURRENT ROW or ORDER BY . . . RANGE BETWEEN UNBOUNDED PRECEDING AND CURRENT ROW) are qualifying window functions.

For instance, MAX, MIN, COUNT, SUM, and AVG are all qualifying window functions (the cumulative average for a given row is calculated using the unordered COUNT and SUM of the set of previous rows, combined with the value of the current row and, if range based, any other rows equal to the given row in the order).

Likewise, many reporting functions (ORDER BY . . . BETWEEN UNBOUNDED PRECEDING AND UNBOUNDED FOLLOWING) are qualifying window functions. Again, MAX, MIN, COUNT, SUM, and AVG are examples of such functions.

FIRST_VALUE is an example of a window function that is not a qualifying window function, as either a cumulative or reporting function. LAST_VALUE is not parallelizable as a reporting function, though it is trivial (and can be optimized away) as a cumulative function.

ROW_NUMBER is a qualifying window function, as it is equivalent to a row-based cumulative COUNT. RANK is a qualifying window function, since the current rank value, even if duplicated among equivalent rows in the order, will always be one greater than the count of all rows *strictly less than* the current row (as opposed to range-based cumulative COUNT, which will always be equal to the count of all rows equal to or less than the current row). Similarly, the NTILE function is also a qualifying window function.

DENSE_RANK is not a qualifying function, however, since the current rank value is not based on the count of all rows strictly less than the current row, but rather on the count of distinct row values strictly less than the current row.

Functional Overview

Techniques are provided for parallelizing qualifying window functions without reliance on partitioning criteria specified in the command that includes the qualifying window functions. Because the techniques do not rely on partitioning criteria specified in the command, the techniques may be used on commands in which no partitioning criteria is specified. In general, the techniques involve partitioning the work of the qualified window function into ranges, and sharing precomputed aggregate values between computational elements to calculate the value for the window functions.

EXAMPLE SYSTEM

FIG. 1 is a block diagram of a system for parallelizing qualifying window functions, according to an embodiment of the invention. Referring to FIG. 1, the system includes a query coordinator 102. Query coordinator 102 generally represents the entity responsible for executing the command that includes the qualifying window function.

The system also includes row sources 106. Row sources 106 generally represent any source that provides the data items that serve as the input to the qualifying window function. In the context of a database server executing a database command, row sources 106 may include a set of slave processes that produce the input consumed by the qualifying window function. For example, row sources 106 may include a set of "producer" slaves that scan, in parallel, different parts of a database table.

The system also includes slave processes 104 that are responsible for performing the qualified window function in parallel. According to one embodiment, parallelization of the qualified window function involves assigning a range 108 to each slave process 104. In the illustrated example, slave process 104-1 is assigned the range 108-1, slave process 104-2 is assigned the range 108-2, etc.

After the range assignments have been made, the input data items are distributed from row sources 106 to slave processes 104 based on the ranges 108 assigned to the slave processes 104. For example, all data items that fall within the range 108-1 are distributed from row sources 106 to slave process 104-1. All data items that fall within range 108-2 are distributed from row sources 106 to slave process 104-2, etc.

Each of the slave processes 104 generates a first result based on the data items it receives. What the first result is may vary, based on the nature of the qualified window function that is being processed. For example, if the qualifying window function is a MAX function, then the first result produced by each slave 108 would be the MAX value of all data items received by the slave 108. On the other hand, if the qualifying window function is a cumulative average, then the first result produced by each slave 108 may include both the SUM and the COUNT of all rows received by that slave. Preferably, the first result is a result that can be generated by a slave 104 without having to first sort the data items that are received by the slave 104.

Once the slaves 104 generate the first results, the first results are provided to the query coordinator 102. The query coordinator 102 then provides to each slave process 104 information that reflects the first results produced by other slave processes 104. The specific information that is provided to a given slave process 104 depends on the nature of the qualifying function, and may also depend the range that is assigned to the given slave process 104.

For example, assume that the qualifying function is the cumulative average. Under these circumstances, the query coordinator 102 would provide back to each given slave process the SUM and COUNT values that the query coordinator 102 receives from all slave processes that are assigned ranges that precede the range assigned to the given slave process. For example, slave process 104-1 is assigned the first range 108-1, so no other slave process is assigned a range that precedes the range assigned to slave process 104-1. Consequently, query coordinator 102 would not provide slave process 104-1 the first results of any other slave process.

On the other hand, slave process 104-2 is assigned range 108-2. Range 108-2 follows range 108-1. Consequently, the query coordinator 102 would provide slave process 104-2 with information that reflects the SUM and COUNT values that were provided to query coordinator 102 by slave process 104-1. Similarly, slave process 104-N is assigned range 108-N. Range 108-N follows ranges 108-1 to 108-(N−1). Consequently, the query coordinator 102 would provide slave process 104-N with information that reflects the SUM and COUNT values that were provided to query coordinator 102 by slave processes 104-1, 104-2, . . . 104-(N−1).

In the example given above, slave process 104-N receives data that reflects the first results produced by several other slave processes. Under these circumstances, query coordinator 102 may provide the raw results to the slave process, or may aggregate the results and provide the aggregated results to the slave process. For example, query coordinator 102 may provide slave process 104-N separate SUM and COUNT values for each of slaves 104-1 to 104-(N−1), or may perform the aggregation itself and provide slave process 104-N a single aggregated SUM, and a single aggregated COUNT.

Based on the information received from the query coordinator 102, each of slave processes 108 is able to generate result values for its input set of data items. How these second result values are generated by the slave process will vary based on the nature of the qualified window function. Continuing with the example given above, slave process 104-2 would receive the SUM and COUNT of all the values received by slave process 104-1. Slave process 104-2 would then sort the input data items that it received, and generate the cumulative average for each of those data items according to the following formula:

> cumulative average for current input item=((sum of input items in range 108-1)+(sum of input items in range 108-2 up to and including the current item))/((count of input items in range 108-1)+ (count of input items in range 108-2 up to and including the current item)).

Parallelization

As illustrated in the preceding example, parallelization of qualifying window functions begins by partitioning the row set into ranges based on the ordering key, and passing one range partition to each of a number of slave processes for computation.

Within each slave process, as rows are being received and prepared for sorting, the slave will compute an intermediate, unordered aggregate based on the requirement of the specific window function. For example, for COUNT, RANK, or ROW_NUMBER, the aggregate would accumulate a count of the input rows. For SUM, the aggregate would accumulate the sum of the input rows. For AVG, two aggregates would accumulate sum and count respectively.

According to one embodiment, when all rows have been received, before performing the sort, each slave process sends a message to the query coordinator process containing the intermediate values computed from the slave's range partition, and then Will block, waiting for a return message from the query coordinator.

The query coordinator collects and saves the intermediate aggregate values sent by each slave. According to one embodiment, once all the slaves have reported, the query coordinator will then respond. It will respond to the slaves in order of their range partitions, starting with the slave computing the lowest values in the ordered set and then continuing with each slave successively greater in the ordered set. To each slave, for each window function, the query coordinator will send either the cumulative aggregation of the intermediate aggregates of all partitions less than that slave's partition, or it will send the total aggregation of all intermediate aggregates from all partitions, or both, depending on the requirements of calculating the window function.

For example, a cumulative SUM would require the cumulative sum of all the sum aggregates from all previous partitions. A reporting COUNT would require the total sum of all the count aggregates from all partitions. NTILE would require both the total sum of all count aggregates from all partitions as well as the cumulative sum of all the count aggregates from all previous partitions.

In the preceding description, the intermediate aggregate values are sent from the slaves to the query coordinator, and from the coordinator back to the slaves. However, in alternative embodiments, the slaves may communicate this information to each other. For example, slave process 104-1 may be instructed to send its intermediate aggregate values to all other slaves. Slave process 104-2, on the other hand, may be instructed to send its intermediate values to all other slaves except slave process 104-1.

In yet another embodiment, the query coordinator sends the intermediate aggregate result values to the appropriate slave process as soon as the query coordinator receives them, rather than waiting for receipt of all of the intermediate aggregate result values.

NTILE EXAMPLE

By way of example, assume that a database server receives a command that requires calculating NTILE over four slave processes. The slave processes are partitioned on the ordering key k, with slave 1 receiving rows where k<5, slave 2 receiving rows where 5 <=k<10, slave 3 receiving rows where 10<=k<20, and slave 4 receiving rows where k >=20.

Suppose the intermediate count aggregates are calculated as 5000 for slave 1, 7500 for slave 2, 6500 for slave 3, and 4500 for slave 4. These are reported to the query coordinator, which, after receiving all values, responds back to each slave with both the cumulative aggregate of the count aggregates from partitions strictly less than that partition, as well as the total aggregate of the count aggregates for all partitions. Specifically, to slave 1 the query coordinator sends 0 for the cumulative aggregate and 23500 for the total aggregate, to slave 2 the query coordinator sends 5000 and 23500, to slave 3 the query coordinator sends 12500 and 23500, and to slave 4 the query coordinator sends 19000 and 23500.

Each slave process, upon receipt of the precomputed aggregates of previous partitions and/or all partitions, then uses these values to calculate the value for rows within that partition. This differs depending on the type of window function. For reporting aggregates, for example, the value for each row is simply the total aggregate we have precomputed. For cumulative SUM, the value of a row is the value of the cumulative sum within the partition offset by the cumulative aggregate of previous partitions. For RANK, the value of a row is the rank within the partition offset by the cumulative aggregate of previous partitions.

Reporting Functions without "Order by" Clauses

For reporting functions without order by clauses, the details of the partitioning are unimportant relative to application of the parallelization techniques described above. The rows could be partitioned, for example, by the hash value of all columns, rather than by range over the partitioning key, since the slave processes would only require the total aggregate of all partitions, not a cumulative aggregate requiring some ordering.

If the output of the window function is being reordered, the same is true for reporting functions with an order by clause. If the output is not being reordered, however, the database server still partitions by range, in order to produce the output in the order specified in the order by clause.

EXAMPLE EXECUTION PLAN

An "iterator-based execution plan" is a way to visually depict a plan for executing a database statement. Iterator-based execution plans are described, for example, in U.S. Pat. No. 5,956,704, entitled "Method and Apparatus for Parallelizing Operations that Insert Data into an Existing Data Container".

In a system that implements that parallelization techniques described herein, the iterator-based execution plan the following query:
SELECT /*+parallel(t 2)*/ A, NTILE(4) OVER (ORDER BY A) FROM tab t;
with a range Table Queue and two DFO's might look like:

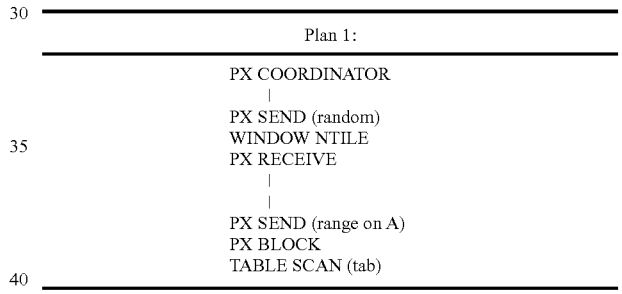

The slave logic of precomputation, synchronous communication with the query coordinator (QC) and postpass to compute the final ntile would be embedded in the fetch method of the window function iterator. The QC support would be embedded in the finite-state messaging engine in the fetch method of the PX iterator, which encapsulates the query-coordinator logic.

Dynamic Range Versus Hash Redistribution with Partition by Clause

As mentioned above, a hash-based parallelization based on the partition-by columns can suffer from under-utilization of parallel slaves if the number of distinct values of the partition-by columns is small.

However, since PARTITION BY is commonly used with window functions, the database server can use the following hybrid technique to decide whether to do a hash or range-based parallelization, and thereby improve slave utilization.

For the purpose of illustration, assume that the database server receives the simple example query:
SELECT /*+parallel(t 2)*/
A, NTILE(4) OVER (PARTITION BY REGION ORDER BY SAL) FROM tab t;
If the number of distinct values of the columns PARTITION BY clause (i.e region) is large (say, a multiple) compared to the number of slaves available (DOP), then the database server may choose the HASH-based parallelization.

On the other hand, if the number of distinct values of SAL is small compared to DOP, then the database server may use a range redistribution based on the concatenation of the PARTITION BY and ORDER BY columns i.e. (REGION, SAL) and use the technique already described above using the NTILE EXAMPLE, where each slave gets the last NTILE value of the same group on the previous slave by communicating with the query coordinator.

For example, with DOP=4 and REGION=(1,2) and SAL between 0 and 5000, a sample execution of the above concatenated range TQ plan could be:
Slave 1 gets rows with (REGION, SAL)=(1, 0 . . . 1000)
Slave 2 gets rows with (REGION, SAL)=(1, 1001 . . . 2000)
Slave 3 gets rows with (REGION, SAL)=(1, 2001 . . . 5000) (2, 0 . . . 1000)
Slave 4 gets rows with (REGION, SAL)=(2, 1001 . . . 5000)

Slave 2 gets the NTILE value of the last row on Slave 1 and adds it to its local NTILE value to compute the final NTILE. Slave 3 gets the NTILE value of the last row on Slave 2 and adds it to its local NTILE value to compute the final NTILE. Slave 4 gets the NTILE value of the last row on Slave 3 and adds it to its local NTILE value to compute the final NTILE.

Grouped Window Functions

Window functions are often grouped together for simultaneous execution. Because of the approach used to parallelize these functions, however, it is sometimes not possible to execute two window functions in the same group. One such case would be a grouping of a cumulative SUM with a window based window function, such as a 3 month moving AVG. The AVG requires the values of several preceding rows, which would not be available on the boundaries of the range-based partitions. According to one embodiment, when situations such as these are encountered, the database server either does not parallelize this group, or else separates the group into its two constituent functions, parallelizing the SUM and then executing the moving AVG serially.

Window Functions and Filtering Predicates

Window functions are often used in conjunction with filtering predicates to see the top or bottom K tuples with respect to the window function value. For example, a query (Q1) to see the employees with the top 10 salaries across the whole company would be:

```
select deptno, ename, sal, rnk
from (select deptno, ename,
        sal,
        RANK (order by sal desc) as rnk
    from emp)
where rnk <= 10
order by rnk;
```

One way to improve the performance of serially executing such queries involves gathering the filtering predicate on the window function, and pushing the filtering predicate into the sort that is computing the window function in the inner query block, so as to only materialize sort results which obey the predicate and discard the rest.

Specifically, the filtering predicate (e.g. rank <=10) is communicated to the slave processes that are performing the sort required by the window function. During the sort operation, those slave processes discard those data items that cannot possibly satisfy the filtering predicate.

When filtering push-down is performed in this manner, the window function iterator is depicted in the iterator-based execution plan as "WINDOW FUNCTION STOPKEY".

Cost-Based Pushdown

U.S. Pat. No. 6,622,138 describes techniques for performing a cost-based pushdown. These techniques may be used even for unpartitioned window functions to reduce the volume of data flowing through the range table queue (TQ), if the value of K is small enough. When such techniques are applied to query Q1 specified above, the resulting iterator-based execution plan will look like:

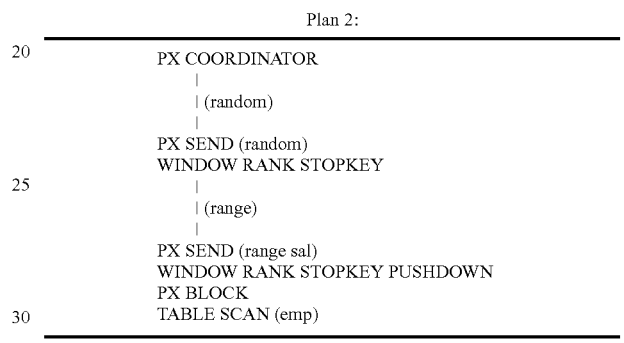

The Degree of Parallelism (DOP) of an operation refers to how many processes are concurrently working on the operation. Depending on the value of K, only the left $(N/DOP)/K=N/(K*DOP)$ slave processes in the second DFO will be producing values which satisfy the window function predicate. In the window function slave processes, the database server can perform optimizations like preventing the postpass after it receives the ranks for the left-predecessors back from the QC, if the rank on its left predecessor is greater than K.

Detemining Wether to Parallelize a Window Function

If the value of K is small (in absolute value or with respect to the total number of rows N) and the window function is the final iterator in the query plan, then the database server can decide to terminate parallelism after the pushdown computation, and opt for the following plan, which has one DFO and will use a single slave set. The final rank value will be computed in serial on at most K*DOP rows.

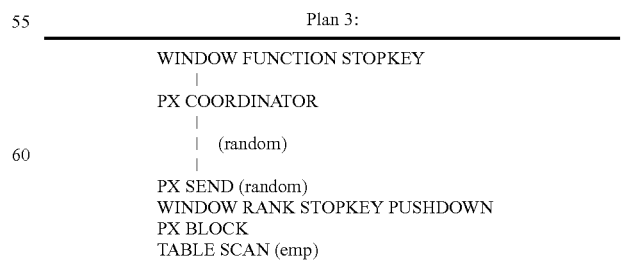

An additional benefit of plan 1, relative to plan 3, is that plan 1 does not terminate parallelism. Consequently, the parallelism that occurs lower in the tree may result in the construction of better parallel plans higher up in the plan tree.

Parallelizing Non-Qualifying Window Functions

Certain window functions that do not satisfy the "qualifying window functions" criteria may be parallelized using a modified version of the techniques described above. Specifically, functions requiring calculation of distinct values in previous sets, such as DENSE_RANK, could be parallelized using a modified technique in which a preliminary pass is made over the rows in the range partition. In the preliminary pass, the slave process calculates the aggregate of the distinct values.

This technique might be used, for example, when hash-based aggregation is used. When used with sort-based aggregation, however, performing a preliminary pass to calculate the aggregate of the distinct values is equivalent to passing the intermediate aggregates after sort is finished, which reduces the effectiveness of parallelization, since the sort is typically far more expensive than the computation of the window function from the sorted row set itself.

Hardware Overview

Figure 2:
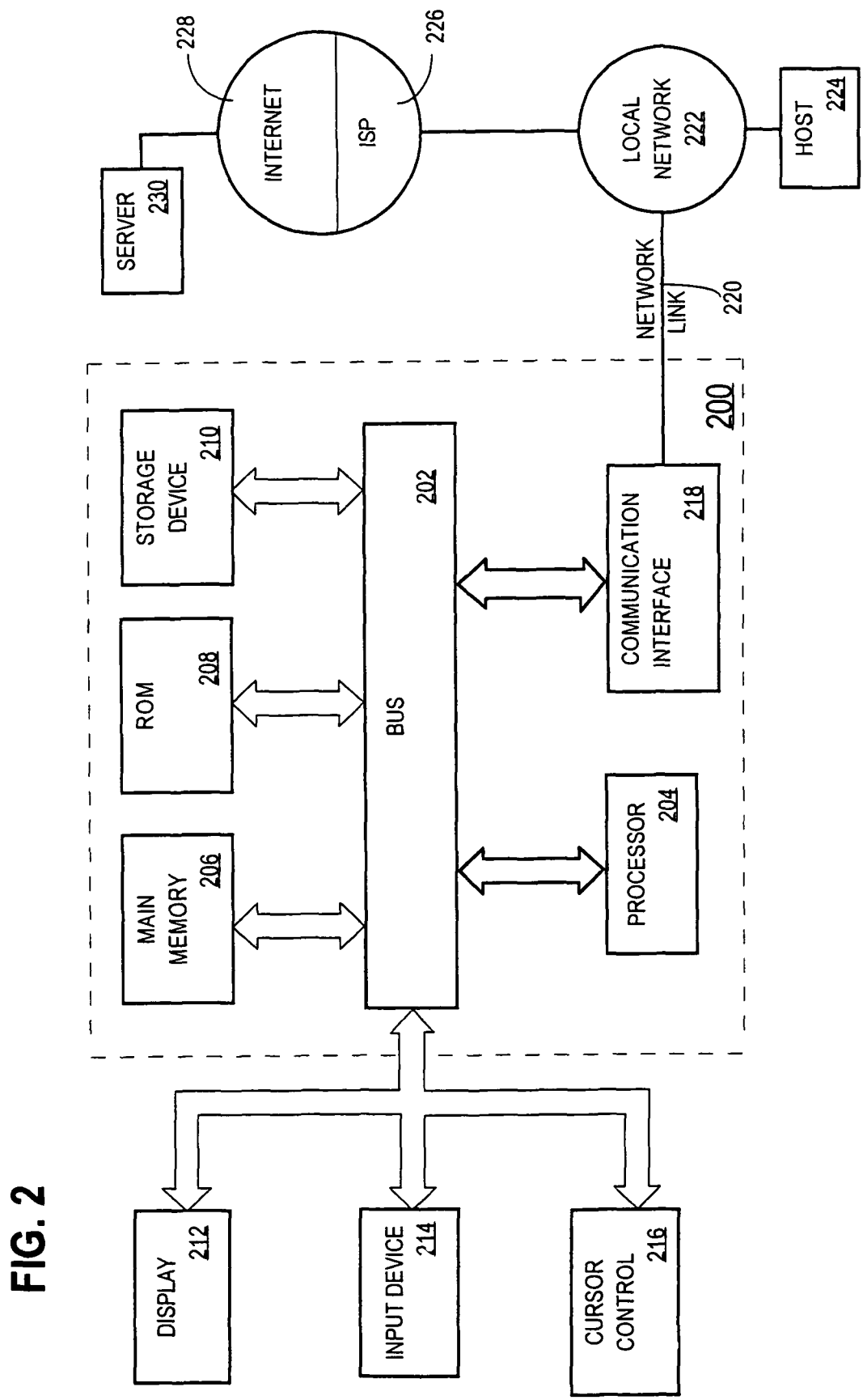
FIG. 2 is a block diagram of a computer system upon which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim 1n any way. The specification and drawings are, accordingly, to be regarded in an illustrative rather than a restrictive sense.

What is claimed is:

1. A method of executing a command that includes a window function, the method comprising:
    during execution of said command,
        obtaining an input item set that serves as input to said window function;
        assigning a partition of the input item set to each of a plurality of slave processes;
        receiving at each of the plurality of slave processes a set of data items that fall within the partition assigned to the slave process;
        producing a plurality of first results by causing each slave process of the plurality of slave processes to perform a first operation related to the window function on the set of data items received by the slave process;
        communicating to each of the plurality of slave processes that produced the plurality of first results information that reflects the first results produced by one or more other slave processes of the plurality of slave processes that produced the plurality of first results; and
        producing a plurality of second results by causing each of the plurality of slave processes to perform a second operation related to the window function based on said information and the data items received by the slave process.

2. The method of claim 1 wherein:
    the step of assigning a partition of an input item set to each of a plurality of slave processes is performed by assigning a range to each of a plurality of slave processes; and
    the step of receiving at each of the plurality of slave processes a set of data items that fall within the partition assigned to the slave process is performed by receiving at each of the plurality of slave processes a set of data items that fall within the range assigned to the slave process.

3. The method of claim 2 wherein the step of communicating to each of the plurality of slave processes information that reflects the first results produced by one or more other slave processes is performed by communicating to each of the plurality of slave processes information that only reflects the first results produced by all slave processes that are assigned ranges that precede the range assigned to the slave process.

4. The method of claim 1 wherein the step of communicating to each of the plurality of slave processes information that reflects the first results produced by one or more other slave processes is performed by communicating to each of the plurality of slave processes information that reflects the first results produced by all of the slave processes.

5. The method of claim 2 wherein:
    within each set of data items, the data items are initially unsorted; and
    the first results are produced by each of the plurality of slave processes without the slave process sorting the data items in the set of data items received by the slave process.

6. The method of claim 5 wherein the step of causing each of the plurality of slave processes to perform a second operation includes causing each of the plurality of slave processes to sort the set of items received by the slave process.

7. The method of claim 2 wherein the step of communicating to each of the plurality of slave processes information that reflects the first results produced by one or more other slave processes of the plurality of slave processes includes:
    causing each of the plurality of slave processes to communicate the first results to a query coordinator; and
    causing the query coordinator to communicate to each of the plurality of slave processes information that reflects the first results produced by one or more other slave processes of the plurality of slave processes.

8. The method of claim 2 wherein the step of communicating to each of the plurality of slave processes information that reflects the first results produced by one or more other slave processes of the plurality of slave processes includes causing the slave processes to communicate the first results to each other.

9. The method of claim 7 wherein the query coordinator communicates the first results to the slave processes without aggregating the first results.

10. The method of claim 7 wherein the query coordinator performs preliminary aggregations on the first results before communicating the first results to the slave processes.

11. The method of claim 1 wherein:
    the partitions that are assigned to the slave processes are formed by hash partitioning; and
    the step of communicating to each of the plurality of slave processes information that reflects the first results produced by one or more other slave processes of the plurality of slave processes includes providing to each of the plurality of slave processes a total aggregate of all partitions.

12. The method of claim 1 wherein producing the plurality of first results includes causing at least one of the slave processes to perform a preliminary pass in which the slave process calculates an aggregate for each distinct value in the set of data items received by the slave process.

13. The method of claim 1 wherein:
    the plurality of second results are used to answer a database command;
    the database command includes a PARTITION BY clause that refers to a PARTITION BY column and an ORDER BY clause that refers to an ORDER BY column; and the step of assigning a partition of an input item set to each of a plurality of slave processes includes assigning, to each of the plurality of slave processes, a range based on a composite key formed by concatenating the PARTITION BY column and the ORDER BY column.

14. A computer-readable volatile or non-volatile storage medium storing one or more sequences of instructions which, when executed by one or more processors, causes the one or more processors to perform the method recited in claim 2.

15. A computer-readable volatile or non-volatile storage medium storing one or more sequences of instructions which, when executed by one or more processors, causes the one or more processors to perform the method recited in claim 3.

16. A computer-readable volatile or non-volatile storage medium storing one or more sequences of instructions which, when executed by one or more processors, causes the one or more processors to perform the method recited in claim 4.

17. A computer-readable volatile or non-volatile storage medium storing one or more sequences of instructions which, when executed by one or more processors, causes the one or more processors to perform the method recited in claim 5.

18. A computer-readable volatile or non-volatile storage medium storing one or more sequences of instructions which, when executed by one or more processors, causes the one or more processors to perform the method recited in claim 6.

19. A computer-readable volatile or non-volatile storage medium storing one or more sequences of instructions which, when executed by one or more processors, causes the one or more processors to perform the method recited in claim 7.

20. A computer-readable volatile or non-volatile storage medium storing one or more sequences of instructions which, when executed by one or more processors, causes the one or more processors to perform the method recited in claim 8.

21. A computer-readable volatile or non-volatile storage medium storing one or more sequences of instructions which, when executed by one or more processors, causes the one or more processors to perform the method recited in claim 9.

22. A computer-readable volatile or non-volatile storage medium storing one or more sequences of instructions which, when executed by one or more processors, causes the one or more processors to perform the method recited in claim 10.

23. A computer-readable volatile or non-volatile storage medium storing one or more sequences of instructions which, when executed by one or more processors, causes the one or more processors to perform the method recited in claim 11.

24. A computer-readable volatile or non-volatile storage medium storing one or more sequences of instructions which, when executed by one or more processors, causes the one or more processors to perform the method recited in claim 12.

25. A computer-readable volatile or non-volatile storage medium storing one or more sequences of instructions which, when executed by one or more processors, causes the one or more processors to perform the method recited in claim 13.

26. A computer-readable volatile or non-volatile storage medium storing one or more sequences of instructions which, when executed by one or more processors, causes the one or more processors to perform the method recited in claim 1.

* * * * *

UNITED STATES PATENT AND TRADEMARK OFFICE
CERTIFICATE OF CORRECTION

PATENT NO. : 8,315,980 B2  
APPLICATION NO. : 11/175804  
DATED : November 20, 2012  
INVENTOR(S) : Ghosh et al.

Page 1 of 1

It is certified that error appears in the above-identified patent and that said Letters Patent is hereby corrected as shown below:

On Title page, in column 2, under "Attorney, Agent, or firm", line 1, delete "Troung" and insert -- Truong --, therefor.

In column 1, line 8-9, delete "Unipartitioned" and insert -- Unpartitioned --, therefor.

In column 2, line 35, delete "sales region," and insert -- sales_region, --, therefor.

In column 2, line 36, delete "RANK( )" and insert -- RANK () --, therefor.

In column 6, line 64, delete "Will" and insert -- will --, therefor.

In column 7, line 38, delete "5 <=k<10," and insert -- 5<=k<10, --, therefor.

In column 10, line 42, delete "Detemining" and insert -- Determining --, therefor.

In column 13, line 28, delete "1n" and insert -- in --, therefor.

Signed and Sealed this  
Fifth Day of February, 2013

Teresa Stanek Rea  
*Acting Director of the United States Patent and Trademark Office*